(12) United States Patent
Pezeshki et al.

(10) Patent No.: US 11,991,644 B2
(45) Date of Patent: May 21, 2024

(54) MPE HANDLING IN OVER-THE-AIR GRADIENT VECTOR AGGREGATION FOR FEDERATED LEARNING

(71) Applicant: QUALCOMM Incorporated, San Diego, CA (US)

(72) Inventors: Hamed Pezeshki, San Diego, CA (US); Tao Luo, San Diego, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 302 days.

(21) Appl. No.: 17/465,625

(22) Filed: Sep. 2, 2021

(65) Prior Publication Data

US 2022/0104142 A1 Mar. 31, 2022

Related U.S. Application Data

(60) Provisional application No. 63/085,116, filed on Sep. 29, 2020.

(51) Int. Cl.
*H04W 52/22* (2009.01)
*H04W 52/14* (2009.01)
*H04W 52/36* (2009.01)

(52) U.S. Cl.
CPC ......... *H04W 52/225* (2013.01); *H04W 52/14* (2013.01); *H04W 52/226* (2013.01); *H04W 52/367* (2013.01)

(58) Field of Classification Search
CPC . H04W 52/225; H04W 52/14; H04W 52/226; H04W 52/367
See application file for complete search history.

(56) References Cited

U.S. PATENT DOCUMENTS

| 2020/0359330 | A1* | 11/2020 | Zacharias | H04W 72/23 |
| 2022/0167335 | A1* | 5/2022 | Go | H04W 52/367 |
| 2022/0256473 | A1* | 8/2022 | Kiilerich Pratas | H04W 52/283 |

* cited by examiner

*Primary Examiner* — John J Lee
(74) *Attorney, Agent, or Firm* — Procopio, Cory, Hargreaves & Savitch LLP

(57) ABSTRACT

This disclosure provides systems, devices, apparatus, and methods, including computer programs encoded on storage media, for managing MPE conditions in over-the-air gradient vector aggregation for federated learning. A UE may receive a federated learning model from a base station for participating in a federated learning procedure with the base station. The UE may update the federated learning model for an iteration of the federated learning procedure based on whether an uplink transmission would cause an MPE threshold to be exceeded. The uplink transmission may have a Tx power level that corresponds to a configured Rx power level at the base station. The UE may drop the uplink transmission if the uplink transmission would cause the MPE threshold to be exceeded.

30 Claims, 12 Drawing Sheets

MPE HANDLING IN OVER-THE-AIR GRADIENT VECTOR AGGREGATION FOR FEDERATED LEARNING

CROSS REFERENCE TO RELATED APPLICATION(S)

This application claims the benefit of and priority to U.S. Provisional Application Ser. No. 63/085,116, entitled "MPE Handling in Over-the-Air Gradient Vector Aggregation for Federated Learning" and filed on Sep. 29, 2020, which is expressly incorporated by reference herein in its entirety.

TECHNICAL FIELD

The present disclosure relates generally to communication systems, and more particularly, to managing maximum permissible exposure (MPE) conditions in over-the-air gradient vector aggregation for federated learning (FL).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may receive a federated learning (FL) model from a base station for participation in an FL procedure with the base station; update the FL model for an iteration of the FL procedure, the update based on whether an uplink transmission would cause a maximum permissible exposure (MPE) threshold to be exceeded, the uplink transmission having a transmit (Tx) power level that corresponds to a configured receive (Rx) power level at the base station; and drop the uplink transmission if the uplink transmission would cause the MPE threshold to be exceeded.

In another aspect of the disclosure, a method, a computer-readable medium, and an apparatus are provided. The apparatus may transmit an FL model to at least one user equipment (UE) for participation in an FL procedure with the at least one UE; and receive, from the at least one UE for an iteration of the FL procedure, an indication of whether an uplink transmission is dropped, the uplink transmission being dropped if the uplink transmission would cause an MPE threshold to be exceeded for the iteration of the FL procedure, the uplink transmission having a Tx power level that corresponds to a configured Rx power level at the base station.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
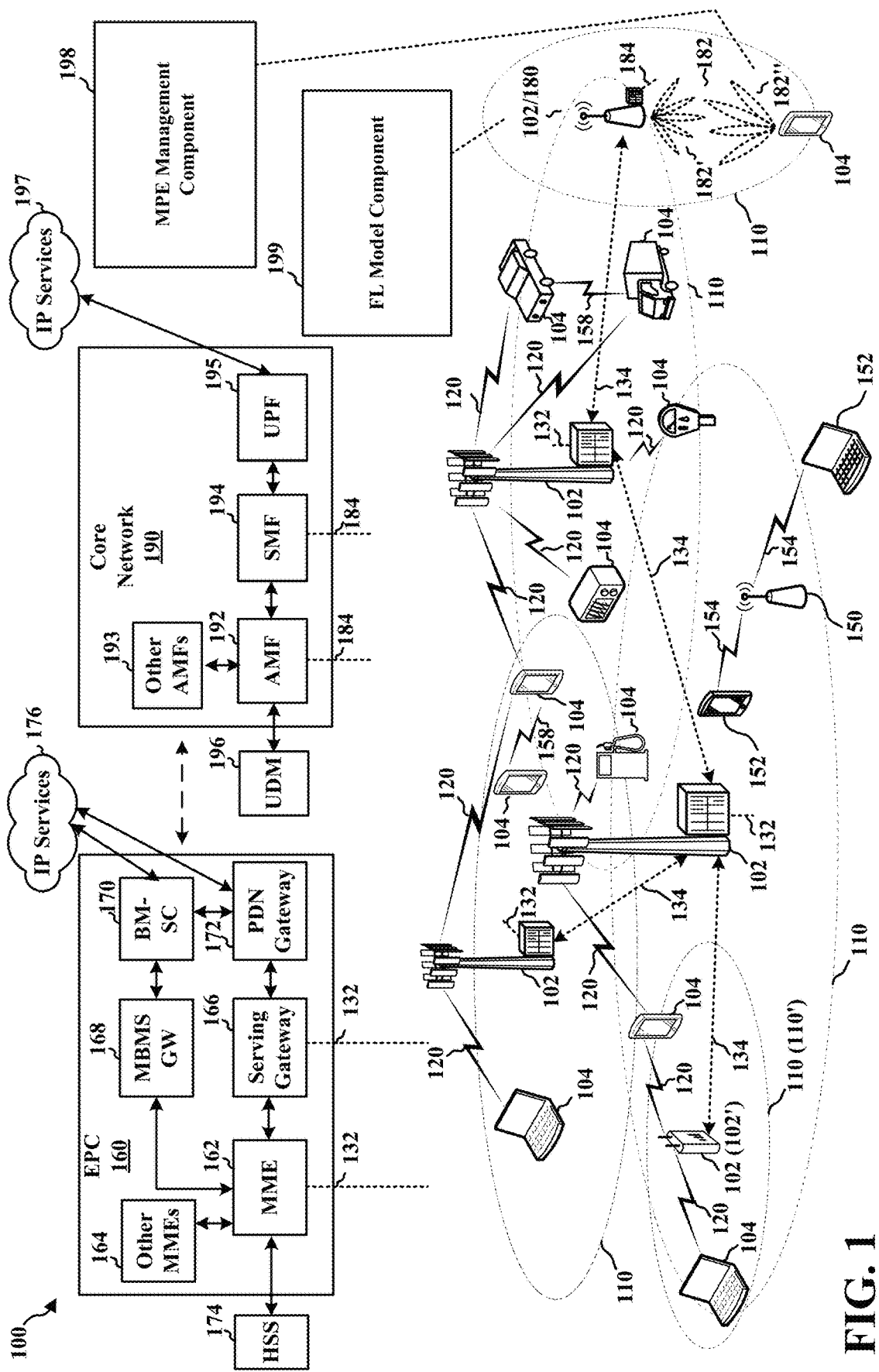
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a maximum permissible exposure (MPE) management component 198 configured to receive a federated learning (FL) model from a base station for participation in an FL procedure with the base station; update the FL model for an iteration of the FL procedure, the update based on whether an uplink transmission would cause an MPE threshold to be exceeded, the uplink transmission having a transmit (Tx) power level that corresponds to a configured receive (Rx) power level at the base station; and drop the uplink transmission if the uplink transmission would cause the MPE threshold to be exceeded. In certain aspects, the base station 180 may include an FL model component 199 configured to transmit an FL model to at least one UE for participation in an FL procedure with the at least one UE; and receive, from the at least one UE for an iteration of the FL procedure, an indication of whether an uplink transmission is dropped, the uplink transmission being dropped if the uplink transmission would cause an MPE threshold to be exceeded for the iteration of the FL procedure, the uplink transmission having a Tx power level that corresponds to a configured Rx power level at the base station. Although the following description may be focused on 5G NR, the concepts described herein may be applicable to other similar areas, such as LTE, LTE-A, CDMA, GSM, and other wireless technologies.

Figure 2:
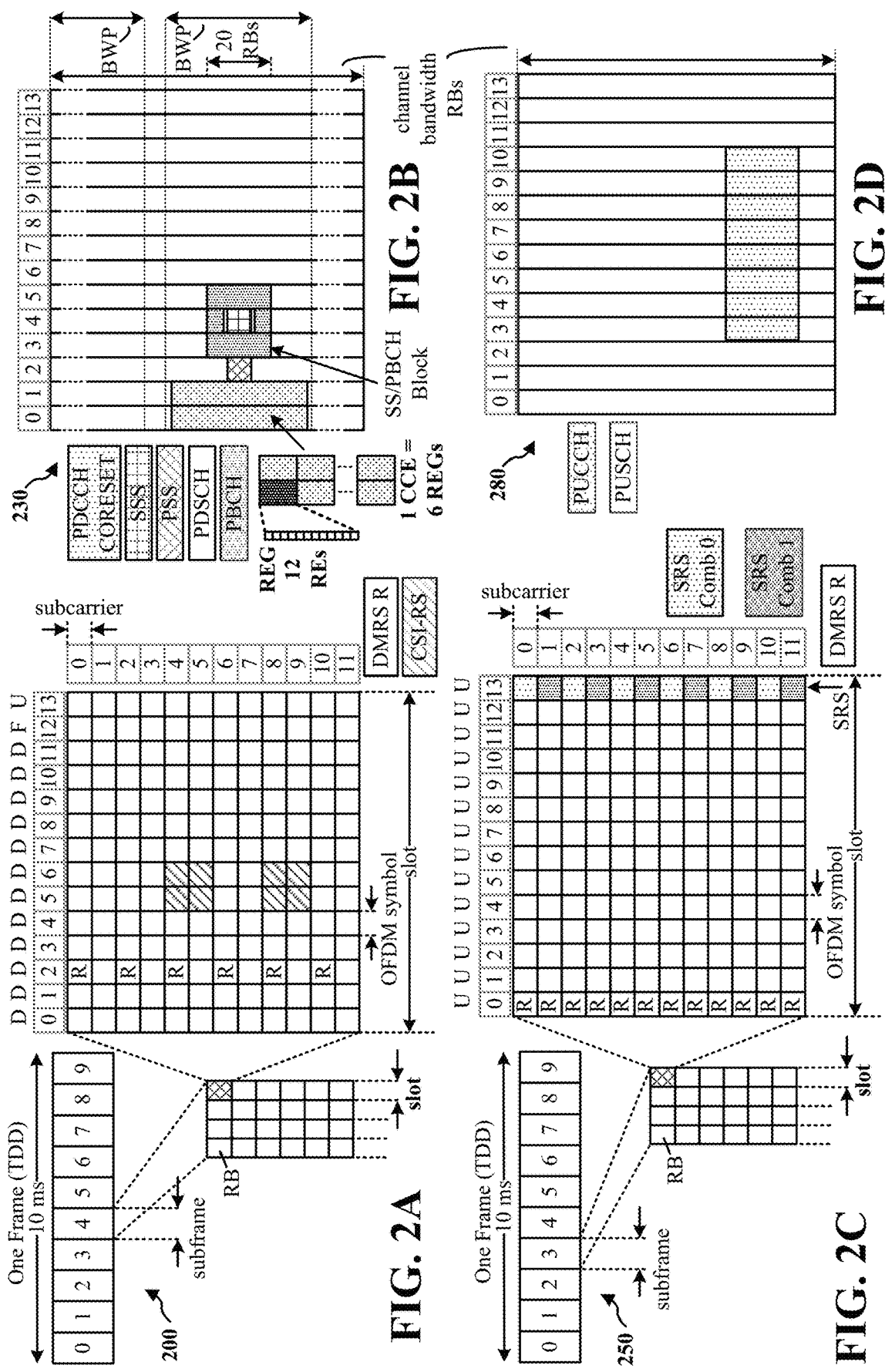
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15\text{[kHz]}$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) ACK/NACK feedback. The PUSCH carries data, and may additionally be used to carry a buffer status report (BSR), a power headroom report (PHR), and/or UCI.

Figure 3:
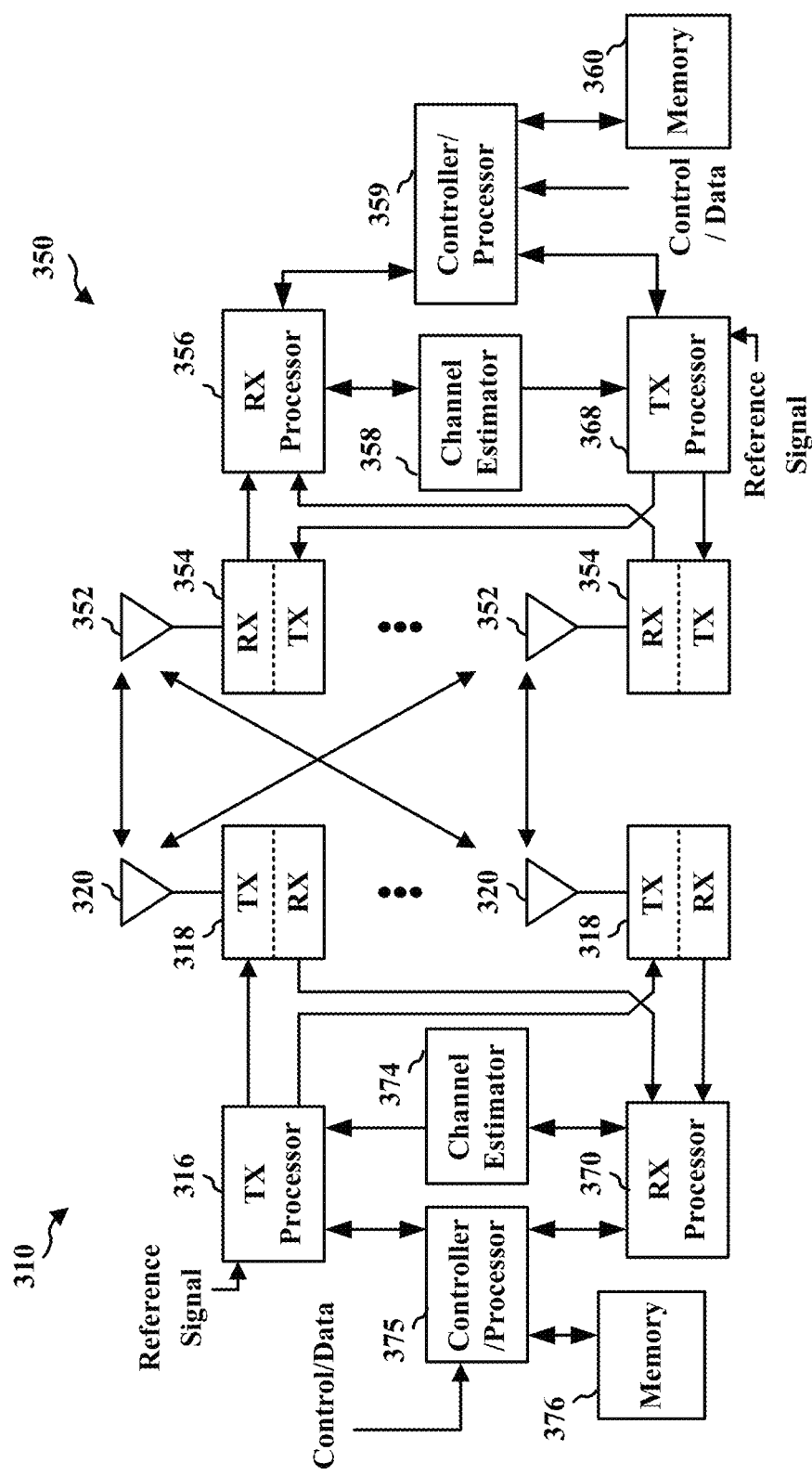
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting;

PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The TX processor 316 and the RX processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the MPE management component 198 of FIG. 1.

At least one of the TX processor 316, the RX processor 370, and the controller/processor 375 may be configured to perform aspects in connection with the FL model component 199 of FIG. 1.

Wireless communication systems may be configured to share available system resources and provide various telecommunication services (e.g., telephony, video, data, messaging, broadcasts, etc.) based on multiple-access technologies such as CDMA systems, TDMA systems, FDMA systems, OFDMA systems, SC-FDMA systems, TD-SCDMA systems, etc. that support communication with multiple users. In many cases, common protocols that facilitate communications with wireless devices are adopted in various telecommunication standards. For example, communication methods associated with eMBB, mMTC, and URLLC may be incorporated in the 5G NR telecommunication standard, while other aspects may be incorporated in the 4G LTE standard. As mobile broadband technologies are part of a continuous evolution, further improvements in mobile broadband remain useful to continue the progression of such technologies.

Figure 4:
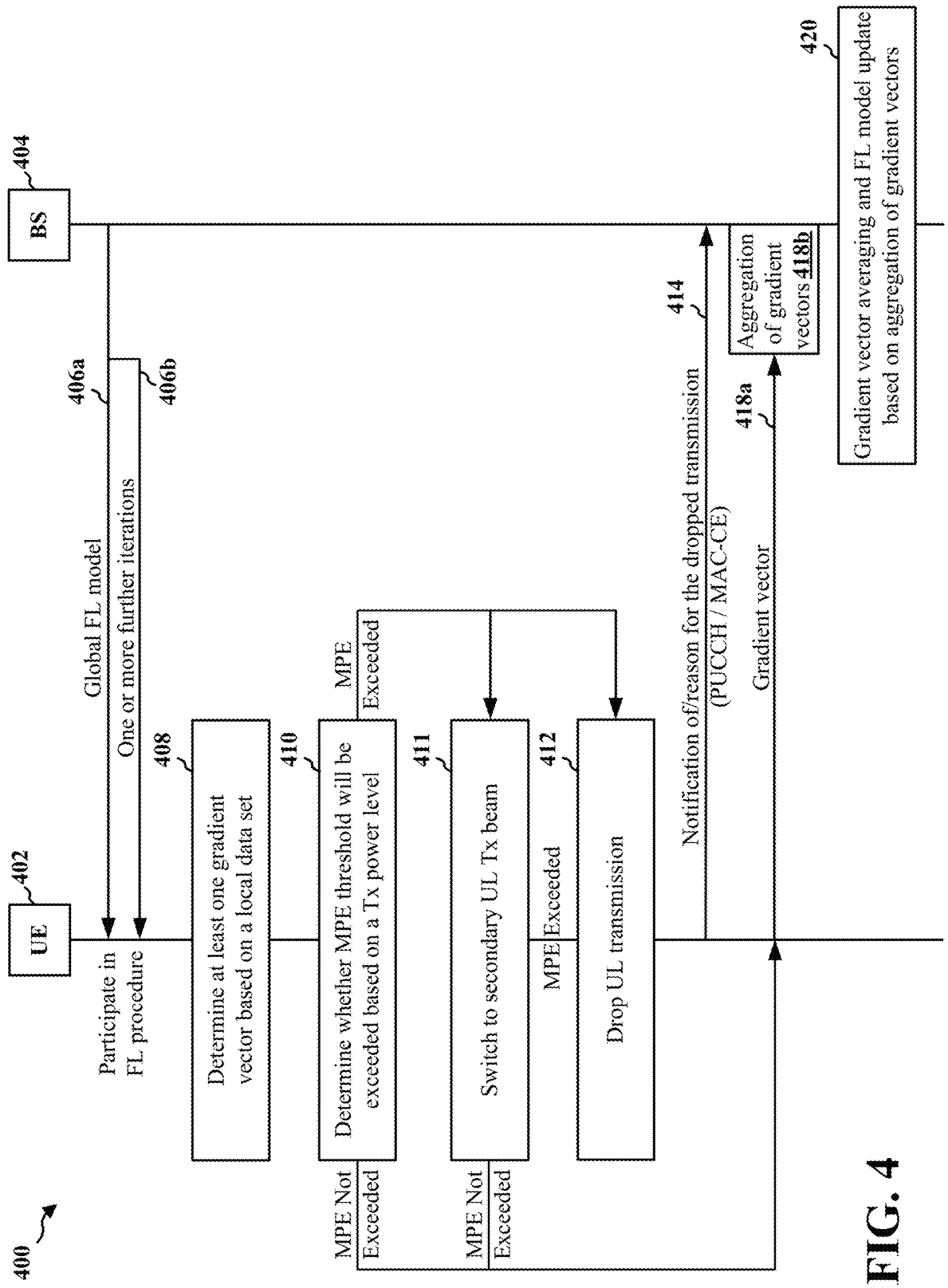
FIG. 4 is a call flow diagram illustrating communications between a UE and a base station.

FIG. 4 is a call flow diagram 400 illustrating communications between a UE 402 and a base station 404. At 406a, the base station 404 may transmit a global FL model to the UE 402, which may participate in an FL procedure. In examples, an updated global FL model may be transmitted, at 406b, to the UE 402 in one or more further iterations of the FL procedure. At 408, the UE 402 may determine at least one gradient vector based on the global FL model received, at 406a, and a local data set of the UE 402.

At 410, the UE may determine whether an MPE threshold is exceeded based on a Tx power level of an UL transmission. If the MPE threshold is not exceeded, the UE 402 may transmit, at 418a, the determined gradient vector to the base station 404. If the MPE threshold is exceeded, the UE 402 may drop, at 412, the UL transmission of the determined gradient vector. At 414, the UE 402 may transmit a notification of the dropped transmission to the base station 404, which may include a reason for the dropped transmission (e.g., MPE threshold exceeded). The notification/reasoning may be transmitted, at 414, from the UE 402 to the base station 404 through a PUCCH or a MAC-control element (MAC-CE).

At 411, if the MPE threshold is determined to be exceeded, the UE 402 may optionally switch to a secondary UL Tx beam. That is, if the MPE threshold is exceeded for a first UL Tx beam, the UE 402 may optionally determine whether the gradient vector may be transmitted through a secondary UL Tx beam for which the MPE threshold is not exceeded and for which the gradient vector may be received at the base station 404 in association with a preconfigured Rx power level to thereby switch, at 411, to the secondary UL Tx beam and transmit the gradient vector, at 418a, to the base station 404. If the UE 402 determines that the MPE threshold is exceeded and/or that the secondary UL Tx beam may not be utilized to transmit the gradient vector to the base station 404, the UE 402 may drop the UL transmission, at 412, and notify the base station 404, at 414. The optional switch, at 411, to the secondary UL Tx beam may be based on a mechanism that reliably ensures the secondary UL Tx beam is received at the base station 404 with an Rx power level that corresponds to a preconfigured power level.

At 418a, the determined gradient vector may be transmitted (e.g., based on the primary UL Tx beam or the secondary UL Tx beam) to the base station 404. At 418b, the base station 404 may receive an aggregation of gradient vectors from the UE 402 and other UEs participating in the FL procedure. The aggregation of gradient vectors received, at 418b, may include the determined gradient vector transmitted, at 418a. At 420, the base station 404 may perform a gradient vector averaging technique and an FL model update based on the aggregation of gradient vectors received, at 418b.

Figure 5:
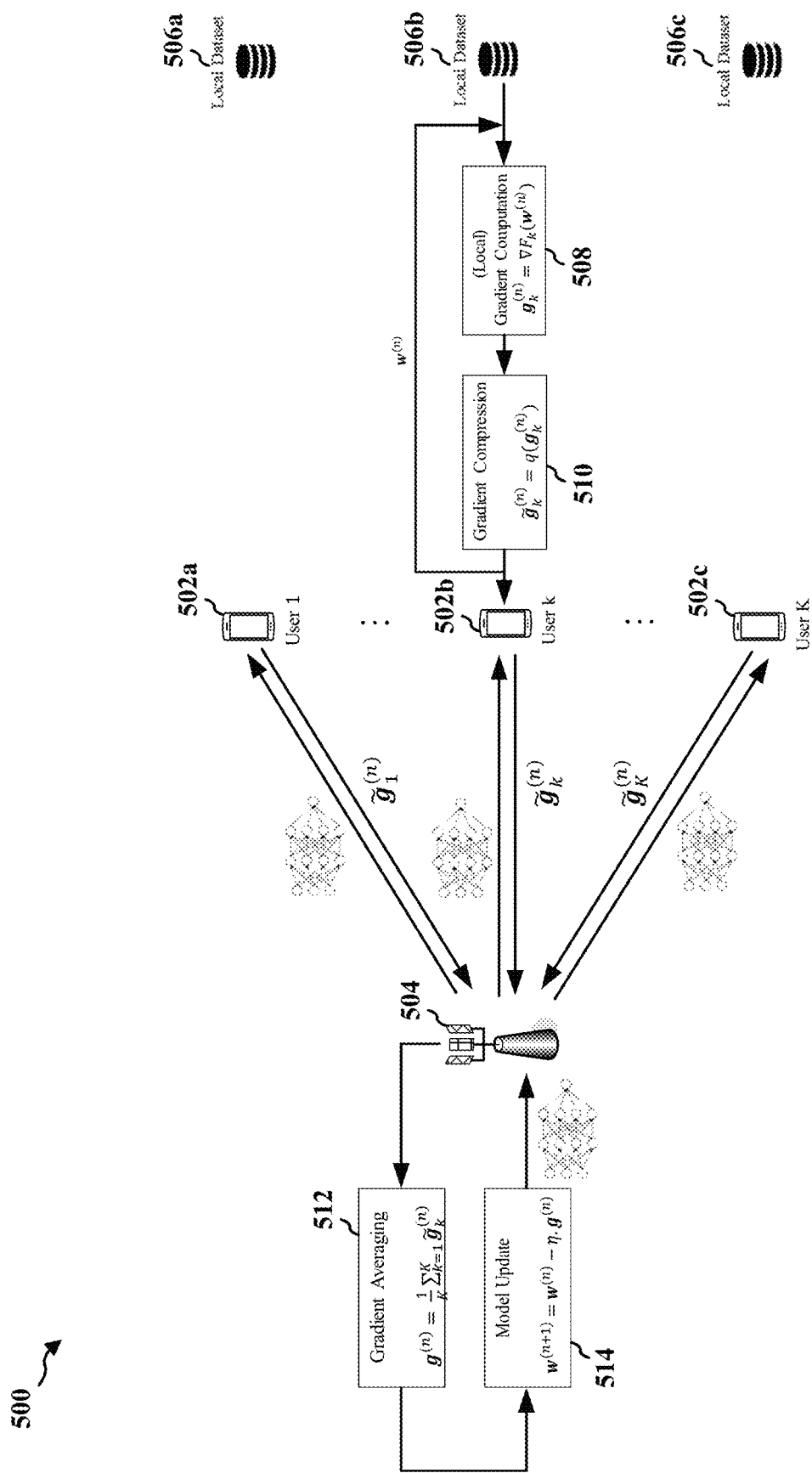
FIG. 5 is a diagram for a federated learning (FL) procedure.

FIG. 5 is a diagram 500 for an FL procedure. The FL procedure may be initiated by a base station 504, which may configure UEs 502a-502c with a neural network. The UEs 502a-502c may be located in different geographic areas and may each train the neural network locally based on respective local data sets 506a-506c. For example, the UE 502b may train the neural network based on the local data set 506b using a local gradient vector computation technique 508 (e.g., $g_k^{(n)} = \nabla F_k(w^{(n)})$) and a gradient vector compression technique 510 (e.g., $\tilde{g}_k^{(n)} = q(g_k^{(n)})$). In some cases, gradient vector compression techniques may correspond to operations such as determining a sign of a gradient element within a gradient vector (e.g., a positive gradient element may correspond to +1 and a negative gradient element may correspond to −1). In other cases, gradient vector compression techniques may include further complexities.

The UE 502b may determine one or more weight updates (e.g., $w^{(n)}$) based on the gradient vector computation technique 508 and the gradient vector compression technique 510 for training the neural network. In the context of cellular systems, the FL procedure may be associated with 1 to K UEs that may be in communication with the base station 504. The base station 504 may broadcast a global neural network model to the UEs 502a-502c that are participating in the FL procedure. The model may include an initial set of parameters/weights ($w^{(0)}$) that may be updated (e.g., via the weight update ($w^{(n)}$)) based on the techniques 508-510, where n may be indicative of an iteration number/index for a FL training round of the training algorithm. In examples, the UEs 502a-502c may each receive the initial weight ($w^{(0)}$) and, based on the local data sets 506a-506c, train the neural network locally to compute a corresponding gradient vector (e.g., $\tilde{g}_1^{(n)}$, $\tilde{g}_k^{(n)}$, $\tilde{g}_K^{(n)}$). The training procedure may be based on a single round of training, where the UE 502b may process the data set 506b and update the gradient vector, or the training procedure may be based on multiple rounds of training with multiple batches of data sets before the UE 502b may determine the updated gradient vector. Such aspects of the training procedure may correspond to different settings that the base station 504 may configure to the UE 502b. For example, the base station 504 may configure the UE 502b to perform 5 iterations/rounds of training, 10 iterations/rounds of training, etc., before transmitting the updated gradient vector to the base station 504.

The local update may be performed through a decentralized procedure based on a stochastic gradient descent (SGD), where each of the UEs 502a-502c may perform a single-step SGD or a multi-step SGD. After the UEs 502a-502c perform the local updates, the UEs 502a-502c may feedback computed gradient vectors $g_k^{(n)}$ or corresponding compressed values $\tilde{g}_k^{(n)}$ to the base station 504. In centralized configurations, the base station 504 may operate as a central server associated with a large data set. That is, the system may not include a distributed data set among the different UEs 502a-502c (e.g., where a size of a data set for UE k may correspond to $D_k$). Instead, the neural network may utilize a unified data set (e.g., without performing a gradient vector averaging technique 512).

For each iteration of the training algorithm, the UEs 502a-502c may each determine a gradient vector update and transmit a compressed gradient vector value to the base station 504. The UEs 502a-502c may transmit the gradient vectors (e.g., $\tilde{g}_k^{(n)}$) to the base station 504, where the gradient vectors may be averaged based on the gradient vector averaging technique 512 (e.g., based on $g^{(n)} = 1/K \Sigma_{K=1}^{K} \tilde{g}_k^{(n)}$ to determine an average gradient vector ($g^{(n)}$). Further, the base station 504 may execute a model update technique 514 (e.g. $w^{(n+1)}=w^{(n)}-\eta \cdot g^{(n)}$) to update the weights of the initial neural network and/or parameters of the global neural network model based on the averaged gradient vector. The procedure may be repeated for further iterations until the global model includes a threshold level of accuracy (e.g., until a convergence occurs in the training algorithm). That is, the base station 504 may compute the gradient vectors, update the weights, and iterate the process until the convergence occurs.

A global loss function may be associated with the neural network that is trained based on the FL algorithm. For each FL training round, a value of the global loss function may decrease. If certain conditions occur (e.g., a rate of change of the loss function decreases by a certain amount, etc.), the global FL algorithm may be determined to have converged. Accordingly, the FL procedure may be performed to determine a weight (w) that reduces the global loss function.

The UEs 502a-502c may not send the data sets 506a-506c directly to the base station 504 for training the neural network due to uplink communication overhead and/or privacy implications. For example, information privacy may be increased based on sending, to the base station 504, a set of numbers indicative of the data sets 506a-506c, rather than sending the content (e.g., text, photos, etc.) to the base station 504 that may be included in the data sets 506a-506c. Determinations by the base station 504 based on the set of numbers/vectors may be independent of the content of the data sets 506a-506c. Further, the uplink communication overhead may be decreased if the local data sets 506a-506c, which may be large in size, are not transmitted directly to the base station 504 for training the neural network, as a size of the gradient vector (e.g., particularly after performing the gradient vector compression technique 510) may be much smaller than a size of the local data sets 506a-506c.

In order to perform over-the-air gradient vector aggregation of $\tilde{g}_1^{(n)}$, $\tilde{g}_k^{(n)}$, $\tilde{g}_K^{(n)}$, the UEs 502a-502c may utilize orthogonal UL channels. The UL channels may be orthogonal in time (e.g., time division multiplexing (TDM)), orthogonal in frequency (e.g., frequency division multiplexing (FDM)), or orthogonal in space (e.g., spatial division multiplexing (SDM), such as through a multi-user (MU)-MIMO transmission). While the base station 504 may be configured to individually receive and decode the gradient vectors associated with each of the UEs 502a-502c over the orthogonal UL channels to perform the gradient vector averaging technique 512, the base station 504 may receive the gradient vectors in an analog manner at a same time and frequency via superposition of multiple wireless access channels. Since an average value for the local gradient vector updates of the UEs 502a-502c may be determined by the base station 504, as opposed to individual values, the superposition of the multiple access channels may be used to aggregate the local gradient vectors over the air. Transmitting gradient vectors from the UEs 502a-502c to the base station 504 in an analog manner may allow the gradient vectors to be aggregated/added together in a received signal by the base station 504, such that the base station 504 may not have to decode the updated gradient vectors individually (e.g., to subsequently add up the individually decoded updated gradient vectors) before performing the gradient vector averaging technique 512. Thus, the base station 504 may divide the received/aggregated gradient vector value by the total number of UEs 502a-502c participating in the FL procedure, as opposed to individually decoding the gradient vectors, to determine the parameter $g^{(n)}$.

Over-the-air aggregation may decrease overhead, as orthogonal UL channels may not utilize successive transmissions, e.g., of the UE 502a followed by the UE 502b followed by the UE 502c. Instead, the UEs 502a-502c may all transmit at the same time. Further, UL channels may utilize a large bandwidth, e.g., where the UE 502a may be allocated a first set of subbands, the UE 502b may be allocated a second set of subbands, and the UE 502c may be allocated a third set of subbands. If the same time and frequency resources are utilized, the transmissions may be aggregated with decreased overhead. In examples, the UL transmissions from the UEs 502a-502c may be coordinated so that the UL transmissions occur simultaneously and the power levels received by the base station 504 are the same, or almost the same, as UEs associated with a larger receive (Rx) power at the base station 504 may bias the gradient vector averaging technique 512. Thus, an equalized level of Rx power from the different UEs 502a-502c may be advantageous. If a channel of the UE 502a corresponds to H, the Tx power of the gradient vector at the base station 504 may be determined based on a channel inversion (e.g., p/H*H, where the H variables cancel each other and the average Rx power from the UE 502a may correspond to p). For the UE 502b, p may be the same or almost the same as for the UE 502a and 502c, so that the gradient vector averaging technique 512 may not be biased toward a UE associated with a higher Rx power at the base station 504.

Figure 6:
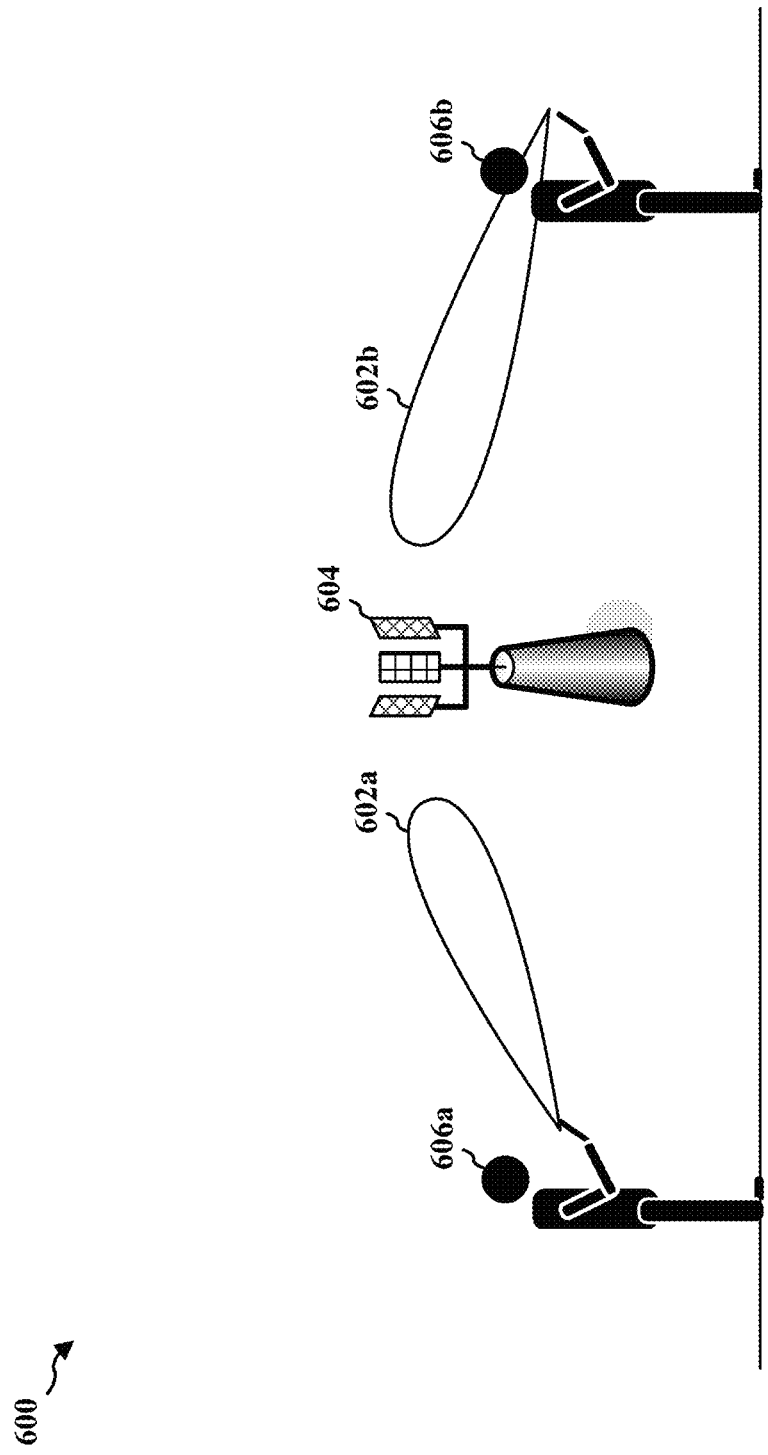
FIG. 6 is a diagram that illustrates beam transmissions in association with a maximum permissible exposure (MPE).

FIG. 6 is a diagram 600 that illustrates beam transmissions 602a-602b in association with MPE. In examples, frequency range 2 (FR 2)/millimeter wave (mmW) applications may utilize MPE techniques, such as regulating beamformed transmissions based on a power density and/or a specific absorption rate (SAR). The power density may be associated with skin heating per unit area in mmW applications, and the SAR may be associated with power absorption per unit volume in sub-6 GHz applications. The power density per unit area may correspond to an upper limit of 1 mW/cm$^2$ based on mmW frequencies ranging from 28 GHz to 39 GHz.

Due to a high path loss at mmW frequencies, a high UL power may be used to maintain a cell radius of the base station 604. The high UL power may be provided via beamforming techniques of phased array antennas. A high UL throughput may be based on an increase in the Tx power at the UE. However, if a person 606b is located in a direction of a beam 602b, the Tx power may be backed off to comply with power density and/or SAR limits. The power back off may correspond to a curve indicative of the Tx power as a function of distance from the UE. For example, if a portion of the people 606a-606b (e.g., head, hand, etc.) are within 14 cm of the UE in the direction of the beams 602-602b, the UE(s) may back off the Tx power. That is, instead of transmitting at a maximum power level, the UEs may adjust the Tx power based on the curve (e.g., as a function of the distance of the UEs from the people 606a-606b). In some cases, the maximum Tx power may be utilized if the UE is farther than 14 cm away from the people 606a-606b.

Power control techniques for maintaining the MPE below a threshold level may include backing off the Tx power and switching an UL Tx beam to a beam that may not have an MPE restriction (e.g., where a person 606a is not located in a direction of the beam 602a). In examples, the beam 602b may have a secondary path (e.g., based on a reflector) for the beam 602b to reach the base station 604. The secondary path may not be limited by the MPE, as there may not be a person in the direction of the reflected beam. Thus, the UE may switch the UL beam and perform a transmission through the secondary path, as opposed to backing off the power.

For over-the-air gradient vector aggregation in FL procedures, a behavior of the UE may be changed if the MPE threshold is exceeded. In cases where the power is backed off, gradient vector averaging may be biased toward the UEs that continue to transmit at a full Tx power level. Thus, if the MPE threshold is exceeded for an UL transmission of a UE (e.g., a person 606b is within 14 cm of the UE), the UE may drop the UL transmission for a particular FL training round. As the FL procedure may be an iterative process, the person 606b may be located in the Tx path of the beam 602b during a first FL training round, but may not be located in the Tx path of the beam 602b during a second FL training round.

A duration of an FL training round may be about 2-3 minutes, but may vary for different FL applications (e.g., individual training rounds of other FL procedures may take additional minutes or hours). After a UE receives the neural network model from the base station 604, the UE may have 2-3 minutes to determine an updated gradient vector and transmit the updated gradient vector to the base station 604 for updating the model based on the gradient vector averaging technique. The base station 604 may subsequently transmit the updated model to the UE for further FL training rounds/iterations. Example configurations may perform about 3,000 FL iterations for the FL algorithm to converge, which may take around 5-7 days to train the final model.

In aspects, the TX power may not be backed off when the Rx power at the base station 604 is to remain at the same level, or at almost the same level, as other transmitting UEs participating in the FL procedure. Otherwise, gradient vector averaging at the base station 604 may be biased toward other UEs transmitting at higher Tx powers. For regular transmissions, the UE may back off the Tx power if the person 606b is in the direction of the beam 602b (e.g., a 23 dBm UL Tx power may be decreased if a hand, head, etc., of the person 606b blocks the beam 602b), which may allow the UE to continue to transmit the beam 602b. However, for transmissions associated with the FL procedure, the UE may drop the transmission rather than backing off the Tx power, so that the gradient vector determined by the base station 604 is not biased, as the base station 604 may not be configured to separately decode the updated gradient vectors received from the UEs. That is, the base station 604 may rely on over the air addition/aggregation of all the gradient vectors received from the UEs in a same signal. If the Rx power from a first UE is p and the Rx power from a second UE is p/2, the determined gradient vector may be biased toward the first UE and may cause an inaccuracy in the gradient vector averaging technique.

Further, the UEs may not have a reliable technique for providing an intended Rx power to the base station 604 when the UL Tx beam is switched to a secondary beam that is not associated with an MPE restriction. The lack of reliability may be based on a path loss of the secondary beam being different from a path loss of the initial beam 602b, where the UE may not be configured to determine a corresponding adjustment to the Tx power of the secondary beam. While such techniques may be used for other types of network traffic, FL procedures may rely on a certain level of coordination for the Rx powers from the multiple UEs. Thus, a UE may drop a particular UL transmission for a particular FL training round, rather than backing off the Tx power. The UE may not opt out of totally participating in the FL procedure, as the UE may later transmit the beam 602b after the person 606b no longer obstructs the path of the beam 602b to the base station 604.

The UE may be configured to notify the base station 604 (e.g., through a PUCCH or a MAC-CE) when the UE drops out of contributing to a particular FL training round. The UE may also indicate a reason for dropping out of the FL training round (e.g., the MPE threshold being exceeded). If the base station 604 configures a set of UEs (e.g., UE 1 to UE k) to provide updated gradient vectors, the gradient vector averaging technique may correspond to 1/k UEs that are participating in the FL training round. However, if one of the UEs is not participating in the FL round (e.g., due to the MPE threshold being exceeded), the base station 604 may determine that the updated gradient vectors are received from k−1 UEs. The UE that is not participating in the FL training round may be excluded from the gradient vector averaging technique based on dividing the aggregated gradient vectors by k−1 to determine the gradient vector average. Thus, the UE may provide the notification to the base station 604, so that the base station 604 may determine a number of UEs contributing to the particular FL training round and the gradient vector averaging technique may be performed in accordance with the number of UEs.

In some examples, prior to dropping transmission of the gradient vector to the base station 604, the UE may switch to a predetermined secondary beam if the primary beam 602b exceeds the MPE threshold. A power control technique for the primary beam 602b may be communicated based on a serving beam pair link (e.g., an Rx beam at the UE side and a Tx beam at the base station side). All of the power control parameters may be set for the primary beam 602b. In order for the predetermined secondary beam to be utilized, a backup beam pair link may be maintained between the UE and the base station 604. Further, a measured path loss for the predetermined secondary beam may be maintained for backing up the primary beam 602b. If the primary beam 602b exceeds the MPE threshold, the UE may switch to the predetermined secondary beam based on the maintained backup beam pair link and the maintained measured path loss of the predetermined secondary beam. If the UE determines, for the predetermined secondary beam, that the MPE threshold is exceeded and/or that the predetermined secondary beam may not be utilized to transmit the gradient vector to the base station, the UE may drop the transmission of the gradient vector to the base station 604 and notify the base station 604 of the dropped transmission.

Figure 7:
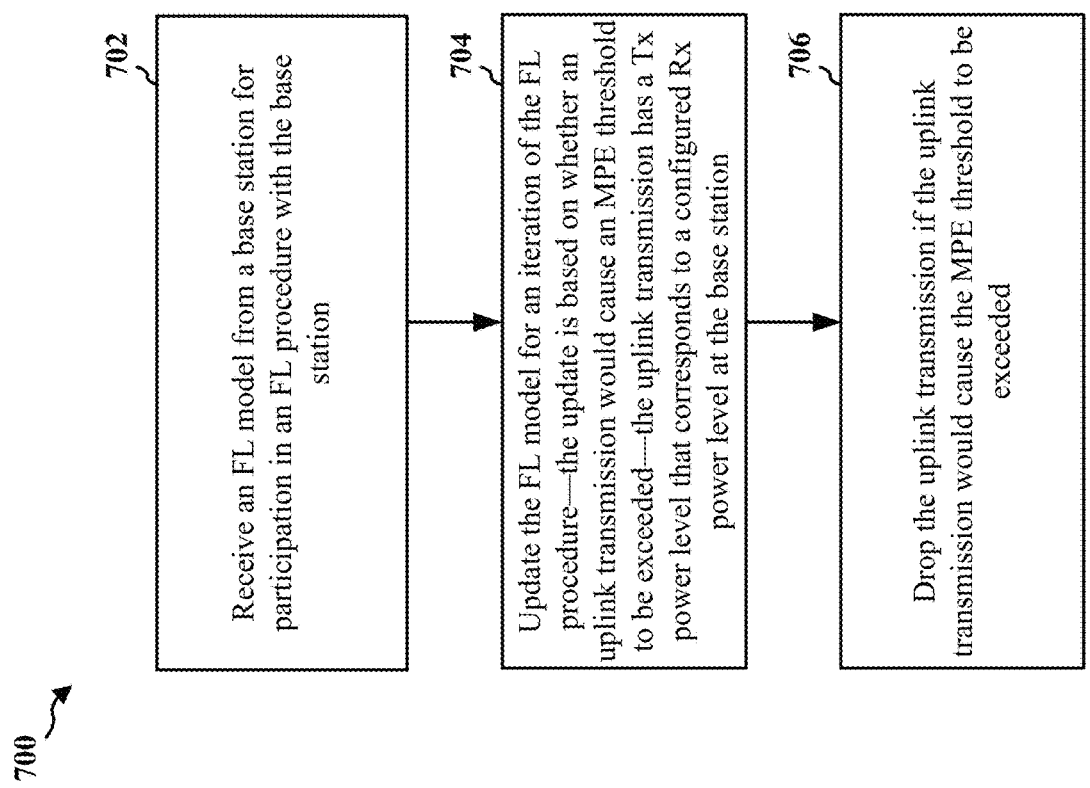
FIG. 7 is a flowchart of a method of wireless communication at a UE.

FIG. 7 is a diagram 700 for a method of wireless communication. The method may be performed by a UE (e.g., the UE 104, 402, 502a-502c; the apparatus 1102; etc.), which may include the memory 360 and which may be the entire UE 104, 402, 502a-502c or a component of the UE 104, 402, 502a-502c, such as the TX processor 368, the RX processor 356, and/or the controller/processor 359.

At 702, the UE may receive an FL model from a base station for participation in an FL procedure with the base station. For example, referring to FIGS. 4-5, the UE 402 may receive, at 406a, a global FL model from the base station 404 for participating in an FL procedure with the base station 404. Further, the diagram 500 includes the UEs 502a-502c, which participate in a FL procedure with the base station 504. The reception, at 702, may be performed by the reception component 1130 of the apparatus 1102 in FIG. 11.

At 704, the UE may update the FL model for an iteration of the FL procedure—the update is based on whether an uplink transmission would cause an MPE threshold to be exceeded—the uplink transmission has a Tx power level that corresponds to a configured Rx power level at the base station. For example, referring to FIG. 4, the UE 402 may determine, at 410, whether an MPE threshold will be exceeded. The determination, at 410, may be based on a Tx power level of an uplink transmission from the UE 402. The update, at 704, may be performed by the updater component 1150 of the apparatus 1102 in FIG. 11.

At 706, the UE may drop the uplink transmission if the uplink transmission would cause the MPE threshold to be exceeded. For example, referring to FIG. 4, the UE 402 may drop, at 412, the UL transmission if the MPE threshold is determined, at 410, to be exceeded. The dropping, at 706, may be performed by the dropper component 1144 of the apparatus 1102 in FIG. 11.

Figure 8:
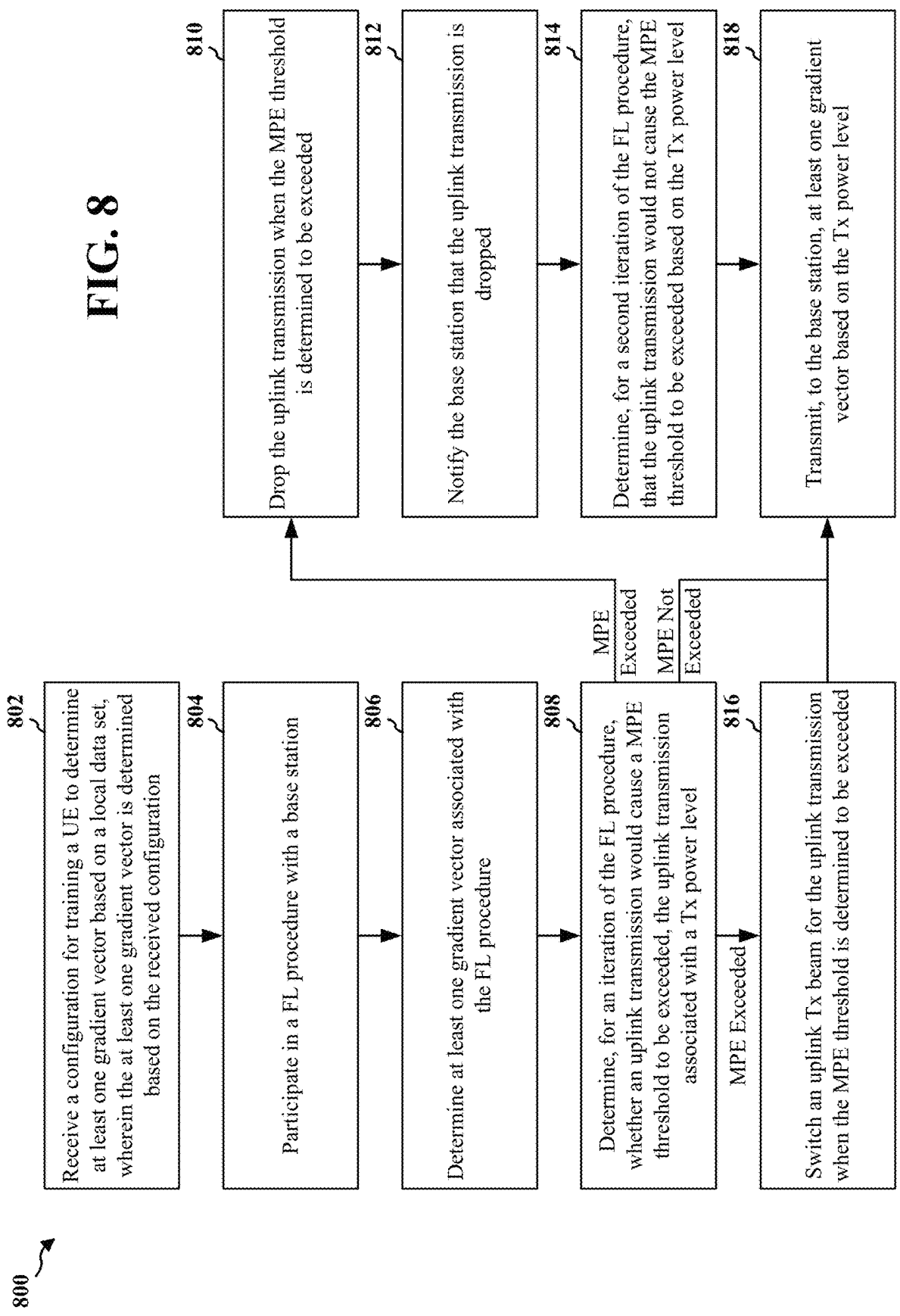
FIG. 8 is a flowchart of a method of wireless communication at a UE.

FIG. 8 is a diagram 800 for a method of wireless communication. The method may be performed by a UE (e.g., the UE 104, 402, 502a-502c; the apparatus 1102; etc.), which may include the memory 360 and which may be the entire UE 104, 402, 502a-502c or a component of the UE 104, 402, 502a-502c, such as the TX processor 368, the RX processor 356, and/or the controller/processor 359.

At 802, the UE may receive a configuration for training the UE to determine at least one gradient vector based on a local data set, where the at least one gradient vector is determined based on the received configuration. For example, referring to FIGS. 4-5, the UE 402 may receive, at 406a, a global FL model from the base station 404. In examples, the UE 502b may be trained based on the local gradient vector computation technique 508 and the gradient vector compression technique 510 utilizing the local data set 506b. The reception, at 802, may be performed by the reception component 1130 of the apparatus 1102 in FIG. 11.

At 804, the UE may participate in a FL procedure with a base station. For example, referring to FIGS. 4-5, the UE 402 may participate in the FL procedure upon receiving, at 406a, the global FL model from the base station 404. Further, the diagram 500 includes the UEs 502a-502c, which participate in a FL procedure with the base station 504. The participating, at 804, may be performed by the participation component 1140 of the apparatus 1102 in FIG. 11.

At 806, the UE may determine at least one gradient vector associated with the FL procedure. For example, referring to FIGS. 4-5, the UE 402 may determine, at 408, at least one gradient vector associated with the global FL model received, at 406a, from the base station 404. Further, the UE 502b may determine at least one gradient vector based on the local gradient vector computation technique 508. The uplink transmission may be indicative of the at least one gradient vector (e.g., $\tilde{g}_k^{(n)}$) determined by the UE 502b. The FL procedure may be based on over-the-air gradient vector aggregation (e.g., aggregation of $\tilde{g}_1^{(n)}$, $\tilde{g}_k^{(n)}$, and $\tilde{g}_K^{(n)}$) associated with a plurality of UEs (e.g., UEs 502a-502c), where the at least one gradient vector (e.g., $\tilde{g}_k^{(n)}$) may be determined for the over-the-air gradient vector aggregation. The uplink transmission may be associated with a plurality of transmissions from the plurality of UEs (e.g., 502a-502c). Each of the plurality of transmissions may have respective Tx power levels that correspond to the configured Rx power level at the base station. The plurality of transmissions may be configured to provide an aggregation of gradient vectors (e.g., $\tilde{g}_1^{(n)}$, $\tilde{g}_k^{(n)}$, and $\tilde{g}_K^{(n)}$) determined by the plurality of UEs (e.g., 502a-502c) for the over-the-air gradient vector aggregation. The determination, at 806, may be performed by the determination component 1142 of the apparatus 1102 in FIG. 11.

At 808, the UE may determine, for an iteration of the FL procedure, whether an uplink transmission would cause a MPE threshold to be exceeded, the uplink transmission having a Tx power level that corresponds to a configured receive (Rx) power level at the base station. For example, referring to FIG. 4, the UE 402 may determine, at 410, whether a MPE threshold will be exceeded based on a Tx power level. The determination, at 808, may be performed by the determination component 1142 of the apparatus 1102 in FIG. 11.

At 810, the UE may drop the uplink transmission when the MPE threshold is determined to be exceeded. For example, referring to FIG. 4, the UE 402 may drop, at 412, the UL transmission when the MPE threshold is exceeded. The dropping, at 810, may be performed by the dropper component 1144 of the apparatus 1102 in FIG. 11.

At 812, the UE may notify the base station that the uplink transmission is dropped. For example, referring to FIG. 4, the UE 402 may provide, at 414, a notification of the dropped transmission to the base station 404. The notification transmitted, at 414, to the base station 404 that the uplink transmission is dropped may occur through at least one of a PUCCH or a MAC-CE. Additionally or alternatively, the notification transmitted, at 414, to the base station 404 may indicate the uplink transmission is dropped based on the MPE threshold being determined to be exceeded. The notification, at 812, may be performed by the notification component 1146 of the apparatus 1102 in FIG. 11.

At 814, the UE may determine, for a second iteration of the FL procedure, that the uplink transmission would not cause the MPE threshold to be exceeded based on the Tx power level. For example, referring to FIG. 4, the UE 402 may determine, at 410, that the MPE threshold is not exceeded for one or more further iterations received, at 406b, from the base station 404. The determination, at 814, may be performed by the determination component 1142 of the apparatus 1102 in FIG. 11.

At 816, the UE may switch an uplink Tx beam for the uplink transmission when the MPE threshold is determined to be exceeded. For example, referring to FIG. 4, the UE 402 may switch, at 411, to a secondary UL Tx beam if the MPE threshold is exceeded. The switching, at 816, may be performed by the switcher component 1148 of the apparatus 1102 in FIG. 11.

At 818, the UE may transmit, to the base station, at least one gradient vector based on the Tx power level (e.g., when the uplink transmission would not cause the MPE threshold to be exceeded). For example, referring to FIGS. 4-5, the UE 402 may transmit a gradient vector, at 418, to the base station 404. Further, the UEs 502a-502c may transmit $\tilde{g}_1^{(n)}$, $\tilde{g}_k^{(n)}$, and $\tilde{g}_K^{(n)}$ to the base station 504. The transmission, at 818, may be performed by the transmission component 1134 of the apparatus 1102 in FIG. 11.

Figure 9:
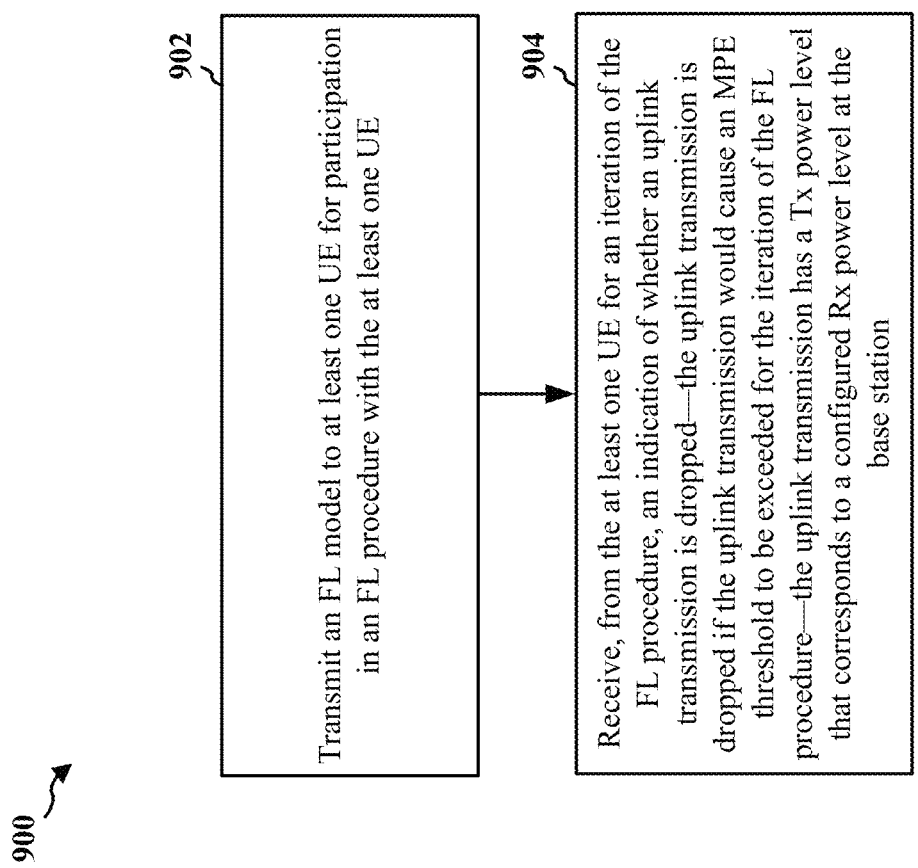
FIG. 9 is a flowchart of a method of wireless communication at a base station.

FIG. 9 is a flowchart 900 of a method of wireless communication. The method may be performed by a base station (e.g., the base station 102, 404, 504, 604; the apparatus 1202; etc.), which may include the memory 376 and which may be the entire base station 102, 404, 504, 604 or a component of the base station 102, 404, 504, 604, such as the TX processor 316, the RX processor 370, and/or the controller/processor 375.

At 902, the base station may transmit an FL model to at least one UE for participation in an FL procedure with the at least one UE. For example, referring to FIGS. 4-5, the base station 404 may transmit, at 406a, a global FL model to the UE 402 for participating in an FL procedure with the UE 402. Further, the diagram 500 includes the base station 504, which participate in an FL procedure with the UEs 502a-502c. The transmission, at 902, may be performed by the Tx FL procedure component 1240 of the apparatus 1202 in FIG. 12.

At 904, the base station may receive, from the at least one UE for an iteration of the FL procedure, an indication of whether an uplink transmission is dropped—the uplink transmission is dropped if the uplink transmission would cause an MPE threshold to be exceeded for the iteration of the FL procedure—the uplink transmission has a Tx power level that corresponds to a configured Rx power level at the base station. For example, referring to FIG. 4, the base station 404 may receive, at 414, a notification of a dropped transmission and/or a reason for the dropped transmission from the UE 402 based on the MPE threshold being exceeded. At 418a, the base station 404 may receive a gradient vector from the UE 402 based on the MPE threshold not being exceeded. The reception, at 904, may be performed by the Rx FL procedure component 1242 of the apparatus 1202 in FIG. 12.

Figure 10:
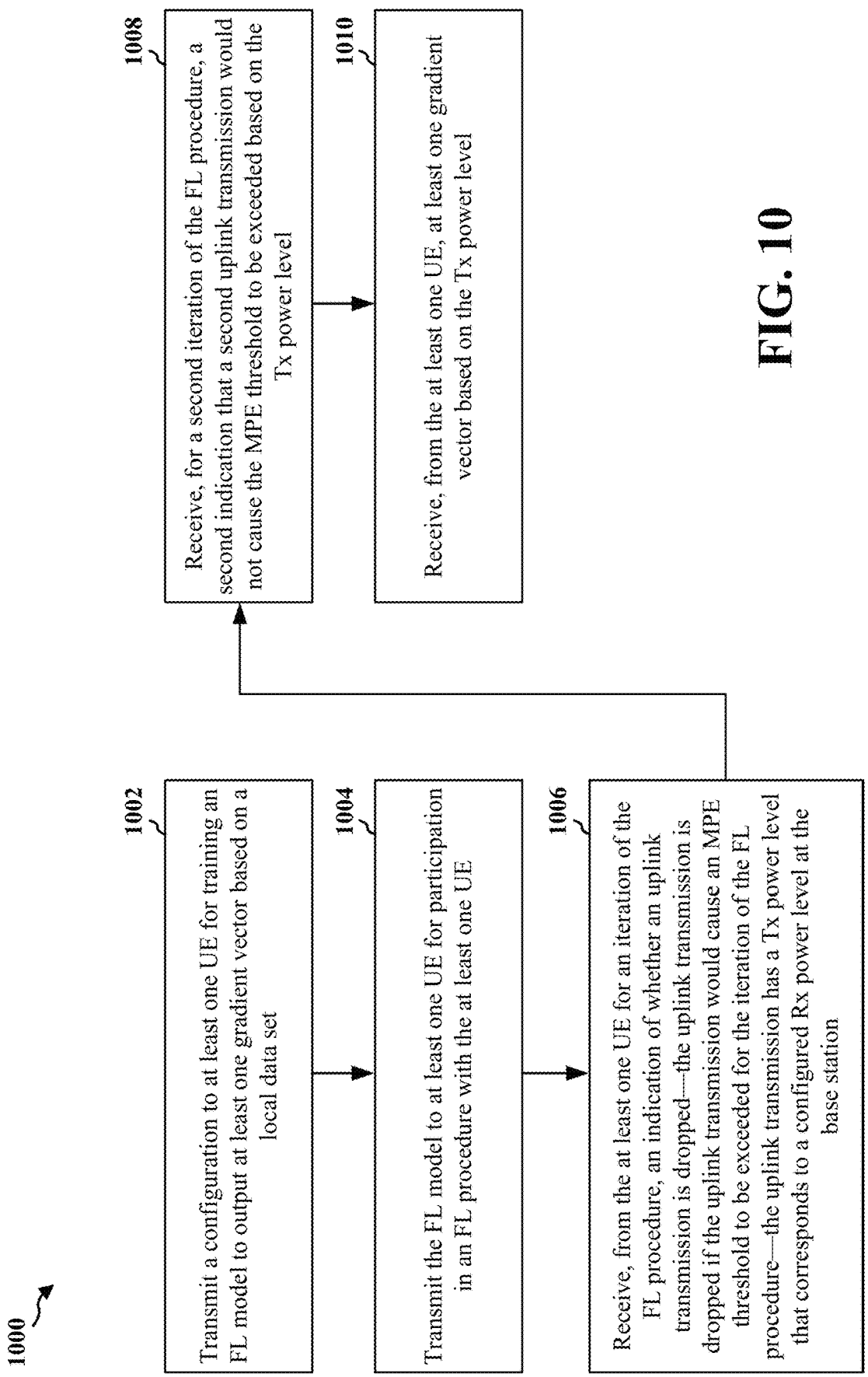
FIG. 10 is a flowchart of a method of wireless communication at a base station.

FIG. 10 is a flowchart 1000 of a method of wireless communication. The method may be performed by a base station (e.g., the base station 102, 404, 504, 604; the apparatus 1202; etc.), which may include the memory 376 and which may be the entire base station 102, 404, 504, 604 or a component of the base station 102, 404, 504, 604, such as the TX processor 316, the RX processor 370, and/or the controller/processor 375.

At 1002, the base station may transmit a configuration to at least one UE for training an FL model to output at least one gradient vector based on a local data set. For example, referring to FIGS. 4-5, the base station 404 may transmit, at 406a, a global FL model configured to output a gradient vector determined, at 408, based on a local data set. In examples, the UE 502b may be trained based on the local gradient vector computation technique 508 and the gradient vector compression technique 510 utilizing the local data set 506b. The transmission, at 1002, may be performed by the Tx FL procedure component 1240 of the apparatus 1202 in FIG. 12.

At 1004, the base station may transmit the FL model to at least one UE for participation in an FL procedure with the at least one UE. For example, referring to FIGS. 4-5, the base station 404 may transmit, at 406a, a global FL model to the UE 402 for participating in an FL procedure with the UE 402. Further, the diagram 500 includes the base station 504, which participate in an FL procedure with the UEs 502a-502c. The transmission, at 1004, may be performed by the Tx FL procedure component 1240 of the apparatus 1202 in FIG. 12.

At 1006, the base station may receive, from the at least one UE for an iteration of the FL procedure, an indication of whether an uplink transmission is dropped—the uplink transmission is dropped if the uplink transmission would cause an MPE threshold to be exceeded for the iteration of the FL procedure—the uplink transmission has a Tx power level that corresponds to a configured Rx power level at the base station. For example, referring to FIG. 4, the base station 404 may receive, at 414, a notification of a dropped transmission and/or a reason for the dropped transmission from the UE 402 based on the MPE threshold being exceeded. At 418a, the base station 404 may receive a gradient vector from the UE 402 based on the MPE threshold not being exceeded. The reception, at 1006, may be performed by the Rx FL procedure component 1242 of the apparatus 1202 in FIG. 12.

The indication (e.g., received at 414 by the base station 404) may notify the base station 404 that the uplink transmission is dropped (e.g., at 412). The indication to the base station 404 that notifies the base station 404 that the uplink transmission is dropped (e.g., at 412) may be received, at 414, via at least one of a PUCCH or a MAC-CE. At least one gradient vector (e.g., received at 418a) may be output from the FL model based on an execution of the FL model. That is, the uplink transmission (e.g., at 418a) may be indicative of the at least one gradient vector. The at least one gradient vector may be output from the FL model after a training procedure is performed in association with the configuration transmitted, at 406a, to the at least one UE 402. The FL procedure may be based on an over-the-air (OTA) gradient vector aggregation, at 418b, associated with a plurality of UEs, the at least one gradient vector being output for the OTA gradient vector aggregation, at 418b. That is, the uplink transmission, at 418a, may be associated with a plurality of transmissions from the plurality of UEs, each of the plurality of transmissions having respective Tx power levels that correspond to the configured Rx power level at the base station 404. The plurality of transmissions may provide an aggregation of gradient vectors, at 418b, from the plurality of UEs for the OTA gradient vector aggregation, at 418b. An uplink Tx beam for the uplink transmission may be switched (e.g., based on 411) if the MPE threshold is exceeded.

At 1008, the base station may receive, for a second iteration of the FL procedure, a second indication that a second uplink transmission would not cause the MPE threshold to be exceeded based on the Tx power level. For example, referring to FIG. 4, the base station 404 may receive, at 418a, the gradient vector from the UE 402 based on the MPE threshold not being exceeded. The determination, at 410, that the MPE threshold is not exceeded may be based on the one or more further iterations transmitted, at 406b, from the base station 404 to the UE 402. The reception, at 1008, may be performed by the Rx FL procedure component 1242 of the apparatus 1202 in FIG. 12.

At 1010, the base station may receive, from the at least one UE, at least one gradient vector based on the Tx power level. For example, referring to FIG. 4, the base station 404 may receive, at 418a, the gradient vector from the UE 402 based on the Tx power level being determined, at 408, to not exceed the MPE threshold. The reception, at 1010, may be performed by the Rx FL procedure component 1242 of the apparatus 1202 in FIG. 12.

Figure 11:
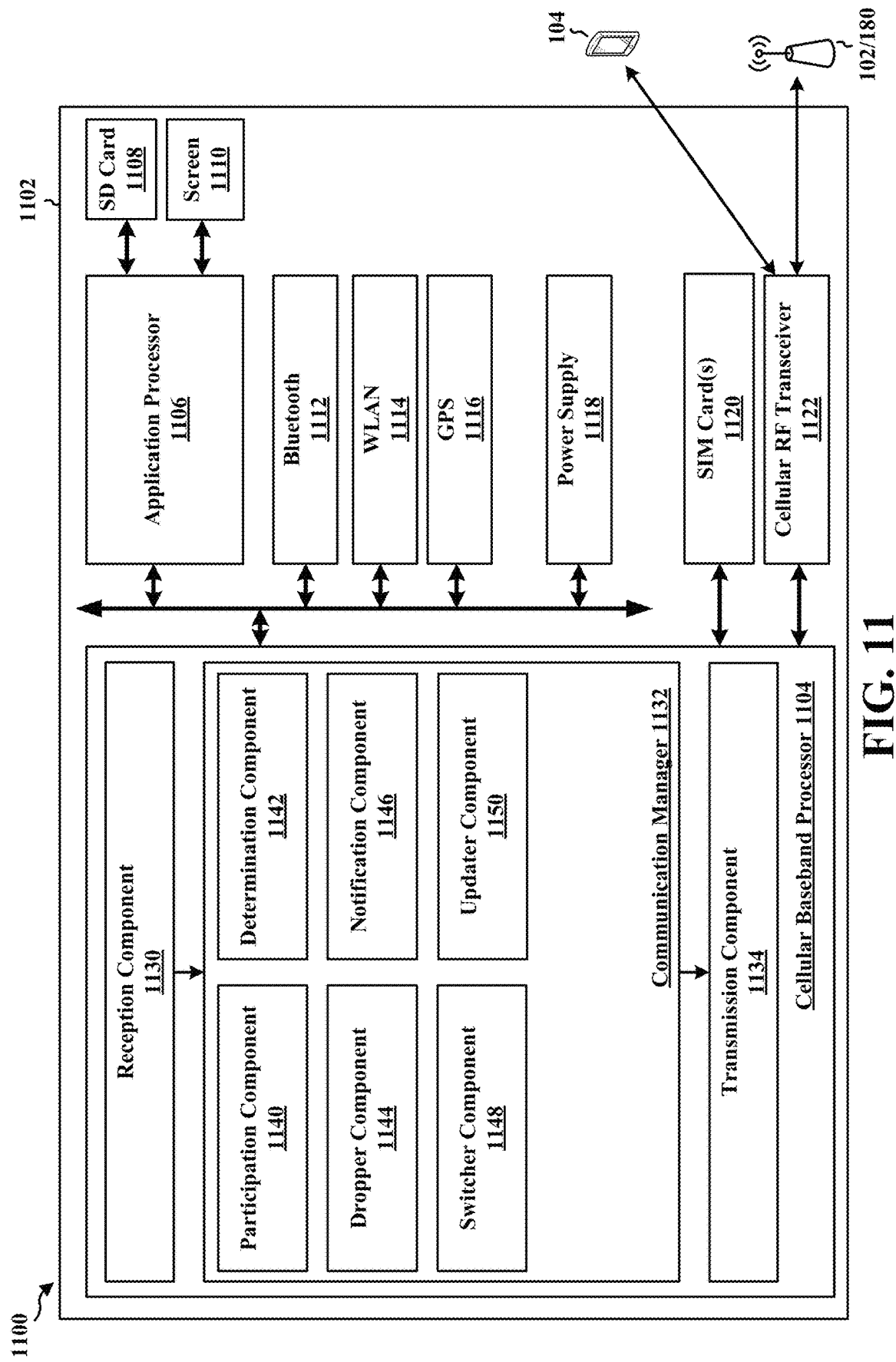
FIG. 11 is a diagram illustrating an example of a hardware implementation for an example apparatus.

FIG. 11 is a diagram 1100 illustrating an example of a hardware implementation for an apparatus 1102. The apparatus 1102 is a UE and includes a cellular baseband processor 1104 (also referred to as a modem) coupled to a cellular RF transceiver 1122 and one or more subscriber identity modules (SIM) cards 1120, an application processor 1106 coupled to a secure digital (SD) card 1108 and a screen 1110, a Bluetooth module 1112, a wireless local area network (WLAN) module 1114, a Global Positioning System (GPS) module 1116, and a power supply 1118. The cellular baseband processor 1104 communicates through the cellular RF transceiver 1122 with the UE 104 and/or BS 102/180. The cellular baseband processor 1104 may include a computer-readable medium/memory. The computer-readable medium/memory may be non-transitory. The cellular baseband processor 1104 is responsible for general processing, including the execution of software stored on the computer-readable medium/memory. The software, when executed by the cellular baseband processor 1104, causes the cellular baseband processor 1104 to perform the various functions described supra. The computer-readable medium/memory may also be used for storing data that is manipulated by the cellular baseband processor 1104 when executing software. The cellular baseband processor 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the cellular baseband processor 1104. The cellular baseband processor 1104 may be a component of the UE 350 and may include the memory 360 and/or at least one of the TX processor 368, the RX processor 356, and the controller/processor 359. In one configuration, the apparatus 1102 may be a modem chip and include just the baseband processor 1104, and in another configuration, the apparatus 1102 may be the entire UE (e.g., see 350 of FIG. 3) and include the aforediscussed additional modules of the apparatus 1102.

The reception component 1130 is configured, e.g., as described in connection with 702, to receive an FL model from a base station for participation in an FL procedure with the base station. The communication manager 1132 includes an updater component 1150 that is configured, e.g., as described in connection with 704, to update the FL model for an iteration of the FL procedure—the update is based on whether an uplink transmission would cause an MPE threshold to be exceeded—the uplink transmission has a Tx power level that corresponds to a configured Rx power level at the base station. The communication manager 1132 further includes a dropper component 1144 that is configured, e.g., as described in connection with 706, to drop the uplink transmission if the uplink transmission would cause the MPE threshold to be exceeded.

The reception component 1130 is configured, e.g., as described in connection with 802, to receive a configuration for training a UE to determine at least one gradient vector based on a local data set. The communication manager 1132 includes a participation component 1140 that is configured, e.g., as described in connection with 804, to participate in a FL procedure with a base station. The communication manager 1132 further includes a determination component 1142 that is configured, e.g., as described in connection with 806, 808, and 814, to determine at least one gradient vector associated with the FL procedure; to determine, for an iteration of the FL procedure, whether an uplink transmission would cause a MPE threshold to be exceeded, the uplink transmission having a Tx power level that corresponds to a configured Rx power level at the base station; and to determine, for a second iteration of the FL procedure, that the uplink transmission would not cause the MPE threshold to be exceeded based on the Tx power level. The dropper component 1144 is further configured, e.g., as described in connection with 810, to drop the uplink transmission when the MPE threshold is determined to be exceeded. The communication manager 1132 further includes a notification component 1146 that is configured, e.g., as described in connection with 812, to notify the base station that the uplink transmission is dropped. The communication manager 1132 further includes a switcher component 1148 that is configured, e.g., as described in connection with 816, to switch an uplink Tx beam for the uplink transmission when the MPE threshold is determined to be exceeded. The transmission component 1134 is configured, e.g., as described in connection with 818, to transmit, to the base station, at least one gradient vector based on the Tx power level.

The apparatus may include additional components that perform each of the blocks of the algorithm in the aforementioned flowcharts of FIGS. 7-8. As such, each block in the aforementioned flowcharts of FIGS. 7-8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1102, and in particular the cellular baseband processor 1104, includes means for receiving an FL model from a base station for participation in an FL procedure with the base station; means for updating the FL model for an iteration of the FL procedure, the update based on whether an uplink transmission would cause an MPE threshold to be exceeded, the uplink transmission having a Tx power level that corresponds to a configured Rx power level at the base station; and means for dropping the uplink transmission if the uplink transmission would cause the MPE threshold to be exceeded. The apparatus 1102 further includes means for notifying the base station that the uplink transmission is dropped (e.g., via the notification component 1146). The apparatus 1102 further includes means for outputting at least one gradient vector based on the update to the FL model (e.g., via the determination component 1142). The apparatus 1102 further includes means for receiving a configuration from the base station for training the FL model to output the at least one gradient vector based on a local data set (e.g., via the reception component 1130). The apparatus 1102 further includes means for updating the FL model for a second iteration of the FL procedure if a second uplink transmission would not cause the MPE threshold to be exceeded based on the Tx power level (e.g., via the updater component 1150). The apparatus 1102 further includes means for transmitting, to the base station, at least one gradient vector based on the Tx power level (e.g., via the transmission component 1134). The apparatus 1102 further includes means for switching an uplink Tx beam for the uplink transmission if the MPE threshold is exceeded (e.g., via the switcher component 1148).

In a further configuration, the apparatus 1102, and in particular the cellular baseband processor 1104, includes means for participating in a FL procedure with a base station; means for determining, for an iteration of the FL procedure, whether an uplink transmission would cause a MPE threshold to be exceeded, the uplink transmission having a Tx power level that corresponds to a configured Rx power level at the base station; and means for dropping the uplink transmission when the MPE threshold is determined to be exceeded. The apparatus 1102 further includes means for notifying the base station that the uplink transmission is dropped. The apparatus 1102 further includes means for determining at least one gradient vector associated with the FL procedure. The apparatus 1102 further includes means for receiving a configuration for training the UE to determine the at least one gradient vector based on a local data set, where the at least one gradient vector is determined based on the received configuration. The apparatus 1102 further includes means for determining, for a second iteration of the FL procedure, that the uplink transmission would not cause the MPE threshold to be exceeded based on the Tx power level; and transmitting, to the base station, at least one gradient vector based on the Tx power level. The apparatus 1102 further includes means for switching an uplink Tx beam for the uplink transmission when the MPE threshold is determined to be exceeded.

The aforementioned means may be one or more of the aforementioned components of the apparatus 1102 configured to perform the functions recited by the aforementioned means. As described supra, the apparatus 1102 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 12:
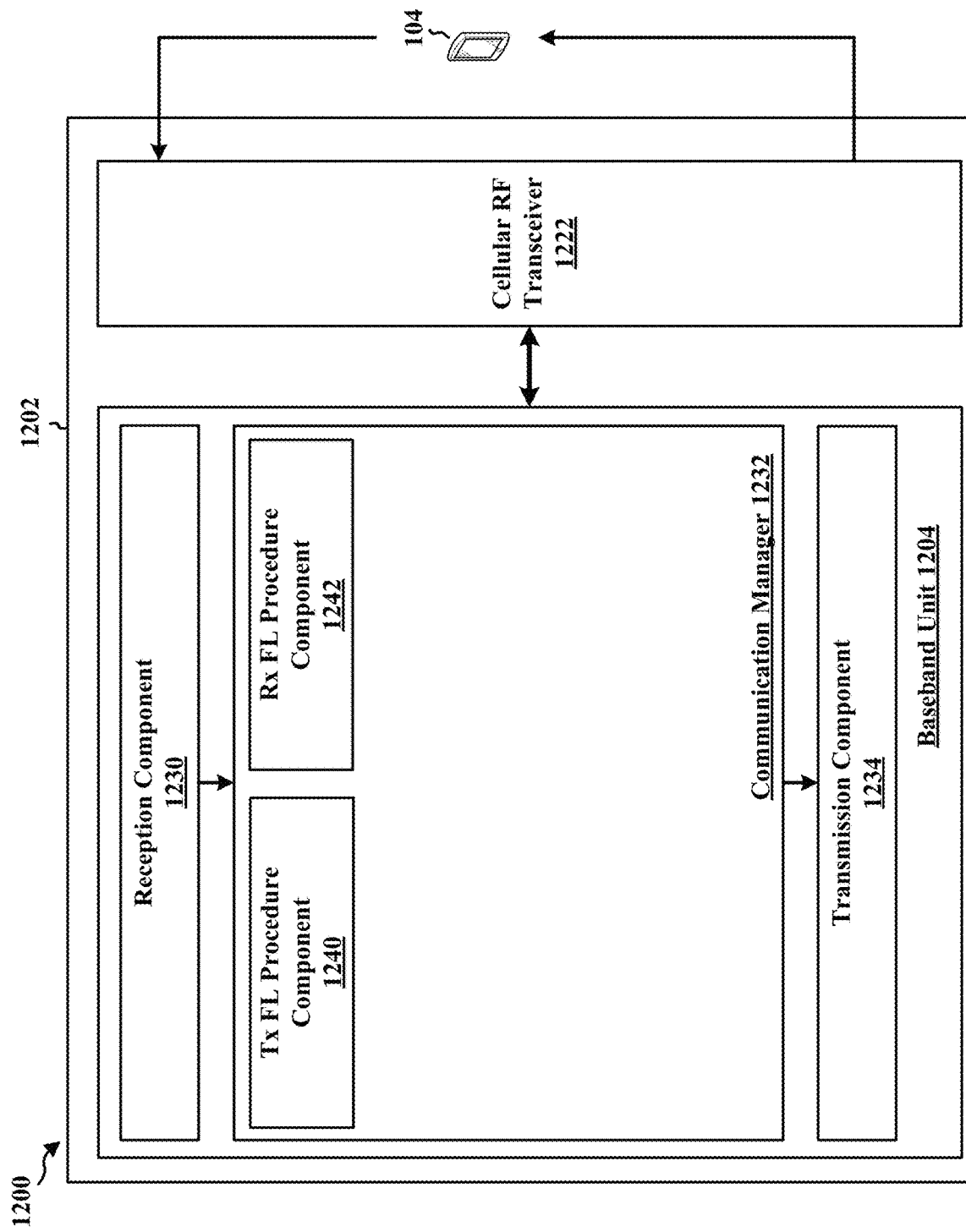
FIG. 12 is a diagram illustrating an example of a hardware implementation for an example apparatus.

FIG. 12 is a diagram 1200 illustrating an example of a hardware implementation for an apparatus 1202. The apparatus 1202 may be a base station, a component of a base station, or may implement base station functionality. In some aspects, the apparatus 1202 may include a baseband unit 1204. The baseband unit 1204 may communicate through a cellular RF transceiver 1222 with the UE 104. The baseband unit 1204 may include a computer-readable medium/memory. The baseband unit 1204 is responsible for general processing, including the execution of software stored on the computer-readable medium/memory. The software, when executed by the baseband unit 1204, causes the baseband unit 1204 to perform the various functions described supra. The computer-readable medium/memory may also be used for storing data that is manipulated by the baseband unit 1204 when executing software. The baseband unit 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the baseband unit 1204. The baseband unit 1204 may be a component of the base station 310 and may include the memory 376 and/or at least one of the TX processor 316, the RX processor 370, and the controller/processor 375.

The communication manager 1232 includes a Tx FL procedure component 1240 that is configured, e.g., as described in connection with 902, 1002, and 104, to transmit a configuration to at least one UE for training an FL model to output at least one gradient vector based on a local data set; and to transmit the FL model to at least one UE for participation in an FL procedure with the at least one UE. The communication manager 1232 further includes an Rx FL procedure component 1242 that is configured, e.g., as described in connection with 904, 1006, 1008, and 1010, to receive, from the at least one UE for an iteration of the FL procedure, an indication of whether an uplink transmission is dropped—the uplink transmission is dropped if the uplink transmission would cause an MPE threshold to be exceeded for the iteration of the FL procedure—the uplink transmission has a Tx power level that corresponds to a configured Rx power level at the base station; to receive, for a second iteration of the FL procedure, a second indication that a second uplink transmission would not cause the MPE threshold to be exceeded based on the Tx power level; and to receive, from the at least one UE, at least one gradient vector based on the Tx power level.

The apparatus may include additional components that perform each of the blocks of the algorithm in the flowcharts of FIGS. 9-10. As such, each block in the flowcharts of FIGS. 9-10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1202 may include a variety of components configured for various functions. In one configuration, the apparatus 1202, and in particular the baseband unit 1204, includes means for transmitting an FL model to at least one UE for participation in an FL procedure with the at least one UE; and means for receiving, from the at least one UE for an iteration of the FL procedure, an indication of whether an uplink transmission is dropped, the uplink transmission being dropped if the uplink transmission would cause an MPE threshold to be exceeded for the iteration of the FL procedure, the uplink transmission having a Tx power level that corresponds to a configured Rx power level at the base station. The apparatus 1202 further includes means for transmitting a configuration to the at least one UE for training the FL model to output the at least one gradient vector based on a local data set. The apparatus 1202 further includes means for receiving, for a second iteration of the FL procedure, a second indication that a second uplink transmission would not cause the MPE threshold to be exceeded based on the Tx power level. The apparatus 1202 further includes means for receiving, from the at least one UE, at least one gradient vector based on the Tx power level.

The means may be one or more of the components of the apparatus 1202 configured to perform the functions recited by the means. As described supra, the apparatus 1202 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE including at least one processor coupled to a memory and configured to receive an FL model from a base station for participation in an FL procedure with the base station; update the FL model for an iteration of the FL procedure, the update based on whether an uplink transmission would cause an MPE threshold to be exceeded, the uplink transmission having a Tx power level that corresponds to a configured Rx power level at the base station; and drop the uplink transmission if the uplink transmission would cause the MPE threshold to be exceeded.

Aspect 2 may be combined with aspect 1 and includes that the at least one processor is further configured to notify the base station that the uplink transmission is dropped.

Aspect 3 may be combined with any of aspects 1-2 and includes that a notification to the base station that the uplink transmission is dropped is provided through at least one of a PUCCH or a MAC-CE.

Aspect 4 may be combined with any of aspects 1-3 and includes that the at least one processor is further configured to output at least one gradient vector based on the update to the FL model.

Aspect 5 may be combined with any of aspects 1-4 and includes that the uplink transmission is indicative of the at least one gradient vector.

Aspect 6 may be combined with any of aspects 1-5 and includes that the at least one processor is further configured to receive a configuration from the base station for training the FL model to output the at least one gradient vector based on a local data set.

Aspect 7 may be combined with any of aspects 1-6 and includes that the at least one gradient vector is output based on the update to the FL model after a training procedure is performed in association with a configuration received from the base station.

Aspect 8 may be combined with any of aspects 1-7 and includes that the FL procedure is based on an OTA gradient vector aggregation associated with a plurality of UEs including the UE, the at least one gradient vector being output for the OTA gradient vector aggregation.

Aspect 9 may be combined with any of aspects 1-8 and includes that the uplink transmission is associated with a plurality of transmissions from the plurality of UEs, each of the plurality of transmissions having respective Tx power levels that correspond to the configured Rx power level at the base station.

Aspect 10 may be combined with any of aspects 1-9 and includes that the plurality of transmissions provides an aggregation of gradient vectors from the plurality of UEs for the OTA gradient vector aggregation.

Aspect 11 may be combined with any of aspects 1-10 and includes that the at least one processor is further configured to update the FL model for a second iteration of the FL procedure if a second uplink transmission would not cause the MPE threshold to be exceeded based on the Tx power level.

Aspect 12 may be combined with any of aspects 1-11 and includes that the at least one processor is further configured to transmit, to the base station, at least one gradient vector based on the Tx power level.

Aspect 13 may be combined with any of aspects 1-12 and includes that the at least one processor is further configured to switch an uplink Tx beam for the uplink transmission if the MPE threshold is exceeded.

Aspect 14 may be combined with any of aspects 1-13 and further includes at least one of a transceiver or an antenna coupled to the at least one processor.

Aspect 15 is an apparatus for wireless communication at a base station including at least one processor coupled to a memory and configured to transmit an FL model to at least one UE for participation in an FL procedure with the at least one UE; and receive, from the at least one UE for an iteration of the FL procedure, an indication of whether an uplink transmission is dropped, the uplink transmission being dropped if the uplink transmission would cause an MPE threshold to be exceeded for the iteration of the FL procedure, the uplink transmission having a Tx power level that corresponds to a configured Rx power level at the base station.

Aspect 16 may be combined with aspect 15 and includes that the indication notifies the base station that the uplink transmission is dropped.

Aspect 17 may be combined with any of aspects 15-16 and includes that the indication to the base station that notifies the base station that the uplink transmission is dropped is received via at least one of a PUCCH or a MAC-CE.

Aspect 18 may be combined with any of aspects 15-17 and includes that at least one gradient vector is output from the FL model based on an update to the FL model.

Aspect 19 may be combined with any of aspects 15-18 and includes that the uplink transmission is indicative of the at least one gradient vector.

Aspect 20 may be combined with any of aspects 15-19 and includes that the at least one processor is further configured to transmit a configuration to the at least one UE for training the FL model to output the at least one gradient vector based on a local data set.

Aspect 21 may be combined with any of aspects 15-20 and includes that the at least one gradient vector is output based on the update to the FL model after a training procedure is performed in association with a configuration transmitted to the at least one UE.

Aspect 22 may be combined with any of aspects 15-21 and includes that the FL procedure is based on an OTA gradient vector aggregation associated with a plurality of UEs including the at least one UE, the at least one gradient vector being output for the OTA gradient vector aggregation.

Aspect 23 may be combined with any of aspects 15-22 and includes that the uplink transmission is associated with a plurality of transmissions from the plurality of UEs, each of the plurality of transmissions having respective Tx power levels that correspond to the configured Rx power level at the base station.

Aspect 24 may be combined with any of aspects 15-23 and includes that the plurality of transmissions provides an aggregation of gradient vectors from the plurality of UEs for the OTA gradient vector aggregation.

Aspect 25 may be combined with any of aspects 15-24 and includes that the at least one processor is further configured to receive, for a second iteration of the FL procedure, a second indication that a second uplink transmission would not cause the MPE threshold to be exceeded based on the Tx power level.

Aspect 26 may be combined with any of aspects 15-25 and includes that the at least one processor is further configured to receive, from the at least one UE, at least one gradient vector based on the Tx power level.

Aspect 27 may be combined with any of aspects 15-26 and includes that an uplink Tx beam for the uplink transmission is switched if the MPE threshold is exceeded.

Aspect 28 may be combined with any of aspects 15-27 and further includes at least one of a transceiver or an antenna coupled to the at least one processor.

Aspect 29 is a method of wireless communication for implementing any of aspects 1-28.

Aspect 30 is an apparatus for wireless communication including means for implementing any of aspects 1-28.

Aspect 31 is a computer-readable medium storing computer executable code, the code when executed by at least one processor causes the at least one processor to implement any of aspects 1-28.

What is claimed is:

1. An apparatus for wireless communication at a user equipment (UE), comprising:
   memory; and
   at least one processor coupled to the memory and configured to:
     receive a federated learning (FL) model from a base station for participation in an FL procedure with the base station;
     update the FL model for an iteration of the FL procedure, the update based on whether an uplink transmission would cause a maximum permissible exposure (MPE) threshold to be exceeded, the uplink transmission having a transmit (Tx) power level that corresponds to a configured receive (Rx) power level at the base station; and
     drop the uplink transmission if the uplink transmission would cause the MPE threshold to be exceeded.

2. The apparatus of claim 1, wherein the at least one processor is further configured to notify the base station that the uplink transmission is dropped.

3. The apparatus of claim 2, wherein to notify the base station that the uplink transmission is dropped, the at least one processor is configured to provide a notification to the base station that the uplink transmission is dropped through at least one of a physical uplink shared channel (PUCCH) or a medium access control-control element (MAC-CE).

4. The apparatus of claim 1, wherein the at least one processor is further configured to output at least one gradient vector based on the update to the FL model.

5. The apparatus of claim 4, wherein the uplink transmission is indicative of the at least one gradient vector.

6. The apparatus of claim 4, wherein the at least one processor is further configured to receive a configuration from the base station for training the FL model to output the at least one gradient vector based on a local data set.

7. The apparatus of claim 4, wherein to output the at least one gradient vector, the at least one processor is configured to output the at least one gradient vector based on the update to the FL model after a training procedure is performed in association with a configuration received from the base station.

8. The apparatus of claim 4, wherein the FL procedure is based on an over-the-air (OTA) gradient vector aggregation associated with a plurality of UEs including the UE, wherein to output the at least one gradient vector, the at least one processor is configured to output the at least one gradient vector for the OTA gradient vector aggregation.

9. The apparatus of claim 8, wherein the uplink transmission is associated with a plurality of transmissions from the plurality of UEs, each of the plurality of transmissions having respective Tx power levels that correspond to the configured Rx power level at the base station.

10. The apparatus of claim 9, wherein the plurality of transmissions provides an aggregation of gradient vectors from the plurality of UEs for the OTA gradient vector aggregation.

11. The apparatus of claim 1, wherein the at least one processor is further configured to update the FL model for a second iteration of the FL procedure if a second uplink transmission would not cause the MPE threshold to be exceeded based on the Tx power level.

12. The apparatus of claim 11, wherein the at least one processor is further configured to transmit, to the base station, at least one gradient vector based on the Tx power level.

13. The apparatus of claim 1, wherein the at least one processor is further configured to switch an uplink Tx beam for the uplink transmission if the MPE threshold is exceeded.

14. The apparatus of claim 1, further comprising at least one of a transceiver or an antenna coupled to the at least one processor.

15. An apparatus for wireless communication at a base station, comprising:
   memory; and
   at least one processor coupled to the memory and configured to:
     transmit a federated learning (FL) model to at least one user equipment (UE) for participation in an FL procedure with the at least one UE; and
     receive, from the at least one UE for an iteration of the FL procedure, an indication of whether an uplink transmission is dropped, the uplink transmission being dropped if the uplink transmission would cause a maximum permissible exposure (MPE) threshold to be exceeded for the iteration of the FL procedure, the uplink transmission having a transmit (Tx) power level that corresponds to a configured receive (Rx) power level at the base station.

16. The apparatus of claim 15, wherein the indication notifies the base station that the uplink transmission is dropped.

17. The apparatus of claim 16, wherein to receive the indication that notifies the base station that the uplink transmission is dropped, the at least one processor is configured to receive the indication that notifies the base station that the uplink transmission is dropped via at least one of a physical uplink shared channel (PUCCH) or a medium access control-control element (MAC-CE).

18. The apparatus of claim 15, wherein at least one gradient vector is output from the FL model based on an update to the FL model.

19. The apparatus of claim 18, wherein the uplink transmission is indicative of the at least one gradient vector.

20. The apparatus of claim 18, wherein the at least one processor is further configured to transmit a configuration to the at least one UE for training the FL model to output the at least one gradient vector based on a local data set.

21. The apparatus of claim 18, wherein the at least one gradient vector is output based on the update to the FL model after a training procedure is performed in association with a configuration transmitted to the at least one UE.

22. The apparatus of claim 18, wherein the FL procedure is based on an over-the-air (OTA) gradient vector aggregation associated with a plurality of UEs including the at least one UE, the at least one gradient vector being output for the OTA gradient vector aggregation.

23. The apparatus of claim 22, wherein the uplink transmission is associated with a plurality of transmissions from the plurality of UEs, each of the plurality of transmissions having respective Tx power levels that correspond to the configured Rx power level at the base station.

24. The apparatus of claim 23, wherein the plurality of transmissions provides an aggregation of gradient vectors from the plurality of UEs for the OTA gradient vector aggregation.

25. The apparatus of claim 15, wherein the at least one processor is further configured to receive, for a second iteration of the FL procedure, a second indication that a second uplink transmission would not cause the MPE threshold to be exceeded based on the Tx power level.

26. The apparatus of claim 25, wherein the at least one processor is further configured to receive, from the at least one UE, at least one gradient vector based on the Tx power level.

27. The apparatus of claim 15, wherein an uplink Tx beam for the uplink transmission is switched if the MPE threshold is exceeded.

28. The apparatus of claim 15, further comprising at least one of a transceiver or an antenna coupled to the at least one processor.

29. A method of wireless communication at a user equipment (UE), comprising:
receiving a federated learning (FL) model from a base station for participation in an FL procedure with the base station;
updating the FL model for an iteration of the FL procedure, the updating based on whether an uplink transmission would cause a maximum permissible exposure (MPE) threshold to be exceeded, the uplink transmission having a transmit (Tx) power level that corresponds to a configured receive (Rx) power level at the base station; and
dropping the uplink transmission if the uplink transmission would cause the MPE threshold to be exceeded.

30. A method of wireless communication at a base station, comprising:
transmitting a federated learning (FL) model to at least one user equipment (UE) for participation in an FL procedure with the at least one UE; and
receiving, from the at least one UE for an iteration of the FL procedure, an indication of whether an uplink transmission is dropped, the uplink transmission being dropped if the uplink transmission would cause a maximum permissible exposure (MPE) threshold to be exceeded for the iteration of the FL procedure, the uplink transmission having a transmit (Tx) power level that corresponds to a configured receive (Rx) power level at the base station.

* * * * *